US008737222B2

(12) United States Patent
Sridhar et al.

(10) Patent No.: US 8,737,222 B2
(45) Date of Patent: May 27, 2014

(54) METHOD AND APPARATUS FOR PROVIDING INCREASED SMALL CELL RESOURCE UTILIZATION

(75) Inventors: Kamakshi Sridhar, Plano, TX (US); Hajo Bakker, Eberdingen (DE); James Paul Seymour, North Aurora, IL (US); Andreas Weber, Lehrensteinsfeld (DE)

(73) Assignee: Alcatel Lucent, Paris (FR)

( * ) Notice: Subject to any disclaimer, the term of this patent is extended or adjusted under 35 U.S.C. 154(b) by 193 days.

(21) Appl. No.: 13/212,807

(22) Filed: Aug. 18, 2011

(65) Prior Publication Data
US 2013/0044600 A1 Feb. 21, 2013

(51) Int. Cl.
*H04L 1/00* (2006.01)
(52) U.S. Cl.
USPC .......................................... 370/235; 370/252
(58) Field of Classification Search
USPC .............................. 370/235, 252; 455/513, 68
See application file for complete search history.

(56) References Cited

U.S. PATENT DOCUMENTS

| 2011/0064051 | A1* | 3/2011 | Clerckx et al. | 370/331 |
| 2012/0113843 | A1* | 5/2012 | Watfa et al. | 370/252 |
| 2012/0115527 | A1* | 5/2012 | Narasimha et al. | 455/513 |
| 2012/0188884 | A1* | 7/2012 | Simonsson et al. | 370/252 |
| 2013/0045694 | A1* | 2/2013 | Nakamura | 455/68 |

FOREIGN PATENT DOCUMENTS

WO WO 2012/100822 A1 * 8/2012 ............ H04W 36/00

OTHER PUBLICATIONS

Nokia Corporation et al.: "SON WI Status Overview," 3GPP Draft; R2-093231, 3$^{rd}$ Generation Partnership Projection (3GPP), Mobile Competence Centre, 650, Route Des Lucioles, F-06921 Sophia-Antipolis Cedex; France, no. San Francisco, USA, 20090428, Apr. 28, 2009, XP050340925, Load balancing by changing mobility parameters; X2/S1 interface used for exchanging load information; paragraph [02.2].
Nokia Siemens Networks: "A necessary procedure to negotiate HO setting for SON load balancing," 3GPP Draft; R3-091355 SON_LB_NEGOTIATIONS, 3$^{rd}$ Generation Partnership Projection (3GPP), Mobile Competence Centre, 650, Route Des Lucioles, F-06921 Sophia-Antipolis Cedex; France, no. San Francisco, USA, 20090429, Apr. 29, 2009, XP050341691, Load balancing by changing cell specific and frequency specific offsets; X2/S1 interface used.

(Continued)

*Primary Examiner* — Albert T Chou
(74) *Attorney, Agent, or Firm* — Harness, Dickey & Pierce

(57) ABSTRACT

A method of determining a bias parameter for a heterogeneous network including a small cell, a macro cell, and one or more user equipment (UEs), the small cell being underlaid with respect to the macro cell, includes determining, at a base station of the small cell, a loading state of the macro cell; and setting, at the base station, the bias parameter based on the determined loading state. A method of determining a cell border window (CBW) for the small cell, the small cell being underlaid with respect to the macro cell, the small cell having a plurality of attached UEs which are divided into inner cell UEs and border cell UEs, includes determining, at the base station, a difference value based on utilization values of the inner cell UEs and the border cell UEs; and adjusting the CBW based on the difference value and a threshold value.

19 Claims, 6 Drawing Sheets

(56) References Cited

OTHER PUBLICATIONS

Telecom Italia et al.: "Self-optimization use case: self-tuning of cell reselection parameters for load balancing," 3GPP Draft; R3-0071432, 3$^{rd}$ Generation Partnership Projection (3GPP), Mobile Competence Centre, 650, Route Des Lucioles, F-06921 Sophia-Antipolis Cedex; France, vol. RAN WG3, no. Athens, Greece; 20070817, Aug. 17, 2007, XP050162260, Load balancing by changing HO reselection parameters; paragraph [0003].

Vodafone: "Small Cell Discovery for Traffic Offloading," 3GPP Draft; R2-114009, 3$^{rd}$ Generation Partnership Projection (3GPP), Mobile Competence Centre, 650, Route Des Lucioles, F-06921 Sophia-Antipolis Cedex; France, vol. RAN WG2, no. Athens, Greece; 20110822, Aug. 15, 2011, XP050539685, Traffic offloading to hetnet nodes from macro cells; paragraph [0002].

International Preliminary Report on Patentability for corresponding international patent application No. PCT/US2012/050897 issued on Feb. 18, 2014.

* cited by examiner

METHOD AND APPARATUS FOR PROVIDING INCREASED SMALL CELL RESOURCE UTILIZATION

BACKGROUND

1. Field

Example embodiments relate generally to small cells within macro cells and in particular to an apparatus and/or method for determining configuration parameters for the small cells.

2. Related Art

Heterogeneous wireless networks include macro base stations (BSs) and small (e.g. pico or femto) BSs. Macro BSs provide wireless coverage for user equipment (UEs) within macro cells which may cover large geographical areas, while small BSs may provide wireless coverage for UEs located in smaller geographical areas within the coverage are of a macro BS.

Small cells may affect the quality of service experienced by users of a heterogeneous wireless network by providing supplemental support for UEs within portions of the geographical area covered by both the macro cell and the small cell.

The 3GPP Release-10 standards have defined the parameters needed to configure LTE small cells. The small cell specific settings are statically configured and downloaded through the operations, administration and maintenance (OAM) node, and the macro enhanced node-B (eNB). These settings include the patterns for an almost blank subframe (ABS). The small cell may configure settings including a cell border window (CBW) and a bias value.

SUMMARY

According to at least one example embodiment, a method of determining a bias parameter for a heterogeneous network including a small cell, a macro cell, and one or more user equipment (UEs) the small cell being underlaid with respect to the macro cell, includes determining, at a base station of the small cell, a loading state of the macro cell; and setting, at the base station, the bias parameter based on the determined loading state.

The set bias parameter may be a parameter which controls a tendency of the one or more UEs to be handed over from the macro cell to the small cell.

The determining step may include determining whether the loading state of the macro cell is an overload state, a high load state or a low load state.

If the loading state is an overload state, setting the bias parameter may include setting the bias parameter to a maximum bias value level.

If the loading state is a high load state, setting the bias parameter may include incrementally increasing the bias parameter until a desired number of UEs are attached to the small cell.

If the loading state is a low load state, setting the bias parameter may include incrementally decreasing the bias parameter until a desired number of UEs are attached to the small cell.

The heterogeneous network may follow the long term evolution (LTE) protocol and implement an enhanced inter cell interference coordination (eICIC) scheme.

According to at least one example embodiment, a method of determining a cell border window (CBW) for a small cell included in a heterogeneous network, the heterogeneous network further including a macro cell, the small cell being underlaid with respect to the macro cell, the small cell having a plurality of attached UEs which are divided into inner cell UEs and border cell UEs, includes determining, at the base station, a difference value based on utilization values of the inner cell UEs and the border cell UEs; and adjusting the CBW based on the difference value and a threshold value.

The CBW may be a parameter which controls a tendency of UEs from among the plurality of attached UEs to be inner UEs or border UEs.

The method may further comprise initializing the CBW as a value between upper and lower CBW limits; determining, at a base station of the small cell, an inner utilization value based on a resource utilization of the inner UEs; and determining, at the base station, a border utilization value based on a resource utilization of the border UEs, wherein the difference value is determined based on the inner utilization and the border utilization.

Determining the difference value may include comparing the inner utilization and the border utilization, calculating a difference between the inner utilization and the border utilization, and determining the calculated difference to be the difference value.

If the base station determines the difference value is above the threshold value and the inner utilization is higher than the border utilization value, the adjusting step may include increasing the CBW until the difference value becomes less than the threshold or the CBW exceeds the upper CBW limit. If the base station determines the difference value is above the threshold value and the inner utilization is lower than the border utilization value, the adjusting step may include decreasing the CBW until the difference value becomes less than the threshold or the CBW becomes lower than the lower CBW limit.

The method may further comprise completing adjustment of the CBW if the CBW is in between the upper and lower CBW limits, and the difference value is below the threshold; adjusting the CBW to equal the upper CBW limit and completing adjustment of the CBW if the CBW is above the upper CBW limit; and adjusting the CBW to equal the lower CBW limit and completing adjustment of the CBW if the adjusted CBW is below the lower CBW limit.

The method may further comprise generating an almost blank subframe (ABS) pattern proposal and sending the ABS pattern proposal from the base station to the macro cell if the base station determines the difference value is above the threshold value and the adjusted CBW is greater than the upper CBW limit or lesser than the lower CBW limit.

The heterogeneous network may follow the long term evolution (LTE) protocol and implement an enhanced inter cell interference coordination (eICIC) scheme.

According to at least one example embodiment, a network apparatus is provided for supporting wireless communications of one or more user equipment (UEs) in a small cell included in heterogeneous communications network, the heterogeneous network further including a macro cell, the small cell being underlaid with respect to the macro cell. The network apparatus comprises a receiver unit configured to receive data; a transmitting unit configured to transmit data; a memory unit configured to store parameters corresponding with characteristics of the small cell; and a processing unit coupled to the transmitting unit, the receiving unit, and the memory unit and configured to control operations associated with determining network parameters for use within the heterogeneous network. The operations include at least one of: (1) determining a bias parameter for the heterogeneous network by determining, at a base station of the small cell, a loading state of the macro cell, and setting, at the base station of the small cell, the bias parameter based on the determined loading state, and (2) determining a cell border window (CBW) for the small cell by determining, at the base station, a difference value based on utilization values of inner cell UEs and the border cell UEs attached to the small cell; and adjusting the CBW based on the difference value and a threshold value.

The set bias parameter may be a parameter which controls a tendency of the one or more UEs to be handed over from the macro cell to the small cell.

Determining the loading state may include determining whether the loading state of the macro cell is an overload state, a high load state or a low load state.

Setting the bias parameter may include one or more of setting the bias parameter to a maximum bias value level if the loading state is an overload state, incrementally increasing the bias parameter until a desired number of UEs are attached to the small cell if the loading state is a high load state, and incrementally decreasing the bias parameter until a desired number of UEs are attached to the small cell if the loading state is a low load state.

The CBW may be a parameter which controls a tendency of UEs from among the plurality of attached UEs to be inner UEs or border UEs.

The processor may further configured to initialize the CBW as a value between upper and lower CBW limits; determine an inner utilization value based on a resource utilization of the inner UEs; and determine a border utilization value based on a resource utilization of the border UEs, wherein the difference value is determined based on the inner utilization and the border utilization.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
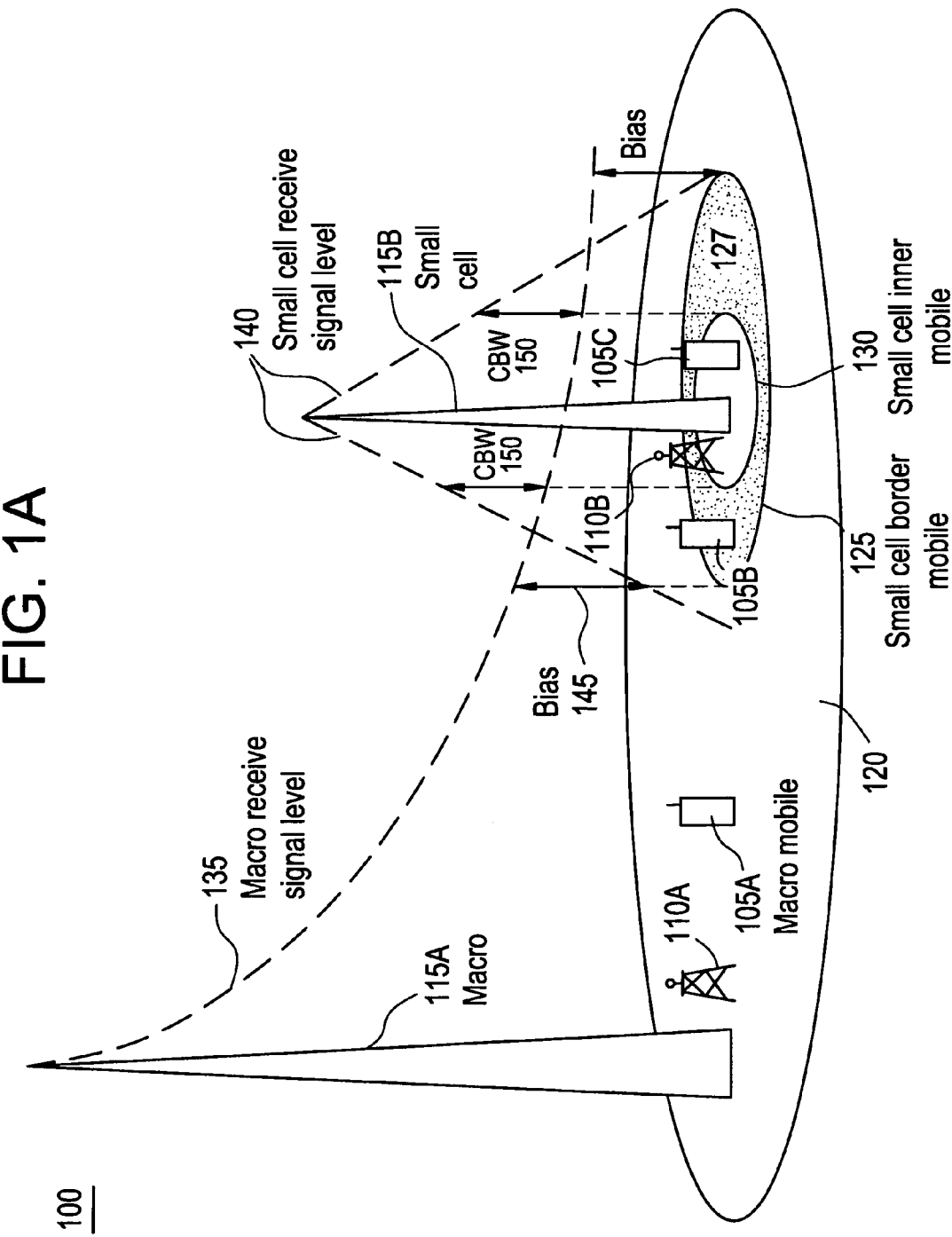
FIG. 1A is a diagram illustrating a portion of a wireless communications network according to at least one example embodiment.

Various at least one example embodiment will now be described more fully with reference to the accompanying drawings in which some example embodiments are shown. Detailed illustrative embodiments are disclosed herein. However, specific structural and functional details disclosed herein are merely representative for purposes of describing at least one example embodiment. Example embodiments may, however, be embodied in many alternate fauns and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, receiver, etc., and may describe a remote user of wireless resources in a wireless communication network. The term base station (BS) may be considered synonymous to and/or referred to as a base transceiver station (BTS), NodeB, extended Node B (eNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an AP shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1A illustrates a portion of a wireless communications network 100. Referring to FIG. 1A, wireless communications network 100 may follow, for example, an LTE protocol. Communications network 100 includes a macro base station (BS) 110A; a small cell BS 110B; a macro cell 120, a small cell 125; and first through third UEs 105A-C. The small cell 125 may be, for example a pico cell or a femto cell. Further, the term small cell as used herein may be considered synonymous to and/or referred to as pico cell or femto cell. The small cell 125 includes a border region 127 and an inner region 130.

In the example illustrated in FIG. 1A, the first UE 105A is attached to the macro cell 120, and the second and third UEs 105B and 105C are attached to the small cell 125. Further, the second UE 105B is designated as a small cell border UE and the third UE 105C is designated as a small cell inner UE. As will be discussed in greater detail below, the attachment of UEs to either the macro cell 120 or the small cell 125 may be controlled by a bias value 145, and the designation of UEs attached to the small cell 125 as small cell inner UEs or small cell border UEs may be controlled by a cell border window (CBW) 150.

Though, for the purpose of simplicity, communications network 100 is illustrated as having only macro BS 110A, small cell BSs 110B, and first through third UEs 105A-C, communications network 100 may have any number of macro BSs, small cell BSs and UEs. Further, the macro BS 110A and small cell BS 110B may be connected to other core network elements included in the communications network 100 including, for example, one or more mobility management entities (MME) and/or one or more operations, administration and maintenance (OAM) nodes (not shown). Further, the MME may include the OAM node.

The macro BS 110A may be, for example, an evolved node B (eNB) providing wireless coverage for UEs within the macro cell 120. The small cell BS 110B may be, for example, an eNB underlaid with respect to the macro BS 110A. The small cell BS 110B may provide wireless coverage for UEs associated with the small cell 125 that supplements coverage provided by the macro BS 110A. Data, control signals and other information described herein as be sent and/or received by the macro cell 120 may be sent and/or received by the macro BS 110A. Further, operations described herein as being performed by the macro cell 120 may be performed by the macro BS 110A. Data, control signals and other information described herein as be sent and/or received by the small cell 125 may be sent and/or received by the small cell BS 110B. Further, operations described herein as being performed by the small cell 125 may be performed by the small cell BS 110B.

In general a transmit power of the macro BS 110A may be greater than a transmit power of the small cell BS 110B. Transmit powers 115A and 115B illustrate an example of the relative transmit powers of the macro BS 110A and the small cell BS 110B, respectively. Macro receive signal level 135 illustrates an example of a strength of a receive signal of the macro cell 120 measured by UEs within communications network 100. As is illustrated in FIG. 1A, in general, the strength of the macro receive signal level may drop as a distance from a location of the macro BS 110A increases. Small cell receive signal level 140 illustrates an example of a strength of a receive signal of the small cell 125 measured by UEs within communications network 100. As is illustrated in FIG. 1A, in general, the strength of the small cell receive signal level 140 may drop as a distance from a location of the small cell BS 110B increases. Though, for the purpose of simplicity, macro and small cell signal levels 135 and 140 are described above and illustrated in FIG. 1A as having strengths which decrease along with an increased distance from a BS, macro and small cell signal strengths can be effected by any of a number of other factors in addition to distance including, for example, shapes and heights of buildings or physical structures within the coverage areas of macro cell 120 and small cell 125, and a number of UEs or an amount of UE traffic within a given region of the coverage area of the macro cell 120 or the small cell 125.

Explanation of Bias Value

UEs in the communications network 100 that are within both a coverage area of the macro cell 120 and a coverage areas of the small cell 125 may be in communication with the communications network 100 via a wireless connection to either the macro BS 110A or one of the small cell BS 110B. A UE in communications network 100 makes a decision with respect to which of the macro cell 120 and the small cell 125 to be associated with by comparing the macro receive signal level 135 as measured by the UE to the small cell receive signal level as measured by the UE with use of a bias value. For example, for a UE i currently attached to the macro cell 120, if $MR(i) < PR(i) + B$, where $MR(i)$ is the macro signal strength 135 measured at the UE and $PR(i)$ is the small cell signal strength 140 measured at the UE and B is the bias 145, then UE i is handed over from the macro cell 120 to the small cell 125. The hand over of the UE i may be performed according to known processes.

Accordingly, once a UE associated with the macro cell 120 determines that the macro receive signal level 135 is below the small cell receive signal level 140 plus a bias value 145, the UE may initiate a hand-over operation from the macro cell 120 to the small cell 125 using known methods. As is illustrated in FIG. 1A, the points at which the macro receive signal level 135 is below the small cell receive signal level 140 plus the bias value 145 define the boundaries of the small cell 125. Accordingly, the bias value 145 may control an amount of UEs which are handed over from the macro cell 120 to the small cell 125 by controlling, for example, a tendency of the UEs to initiate a hand off operation.

Explanation of CBW

When the macro cell 120 and the small cell 125 transmit data over downlink connections to associated UEs, the transmissions of the macro cell 120 may cause interference for UEs receiving data from the small cell 125 (e.g., those like the second UE 105B). Further, the transmissions of the small cell 125 may cause interference for UEs receiving data from the macro cell 120 (e.g., those like the first UE 105A). Accordingly, wireless communications network 100 implements an interference reduction scheme which, as will be discussed in greater detail below, includes dividing UEs attached to the small cell 125 into small cell inner UEs and small cell border UEs using the CBW 150. For example, the wireless communication network 100 may implement the enhanced inter cell interference coordination (eICIC) scheme defined by the 3GPP Release 10 standards. For example, in order to reduce an amount of interference experienced by UEs receiving downlink transmissions, transmissions for UEs designated as small cell border UEs (e.g., those like the second UE 105B in small cell border region 127) may be scheduled at a different time from transmissions for UEs designated as small cell inner UEs (e.g., those like the third UE 105C within small cell inner region 130) and UEs attached to the macro cell 120 (e.g., those like the first UE 105A). This feature will now be discussed in greater detail below with reference to FIG. 1B.

Figure 1B:
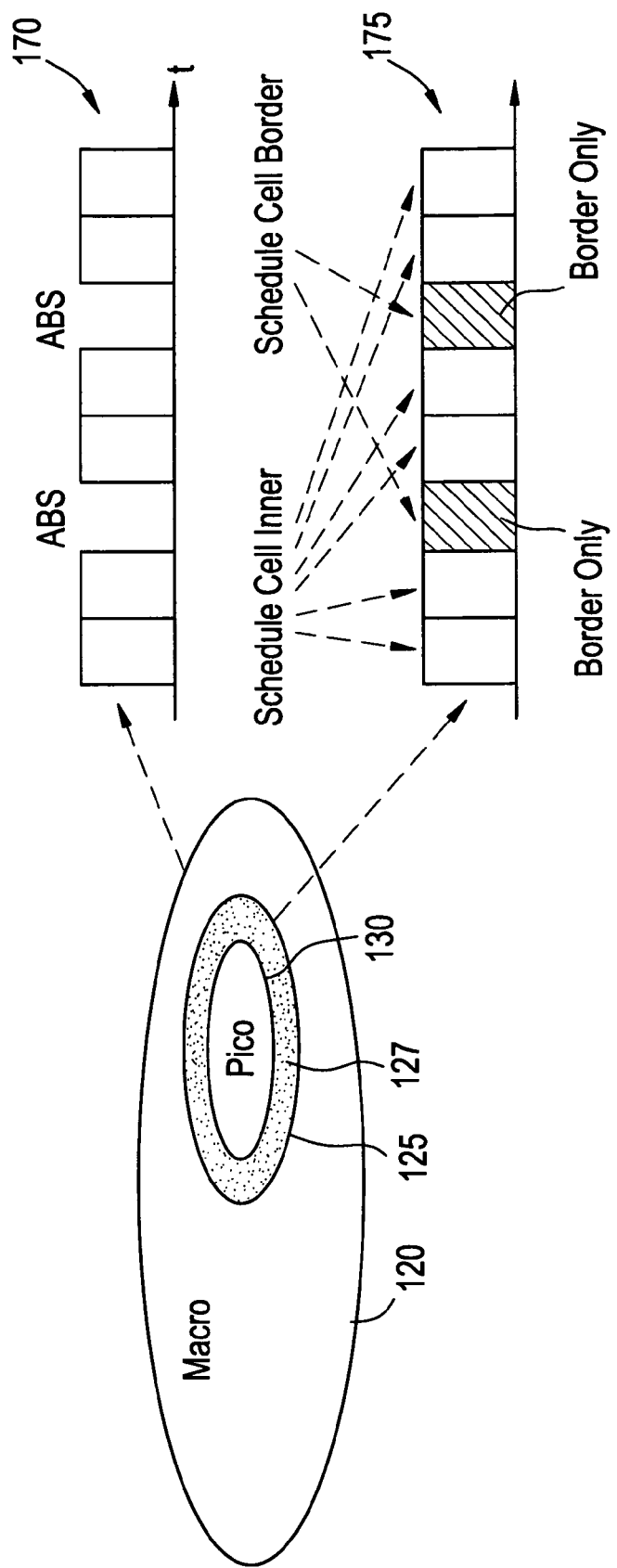
FIG. 1B is a diagram illustrating an example relationship between transmission schedules for macro and small cells.

FIG. 1B is a diagram illustrating an example relationship between transmission schedules for macro and small cells 120 and 125. Referring to FIG. 1B, first graph 170 illustrates subframes transmitted over time for the macro cell 120 and second graph 175 illustrates subframes transmitted over time for the small cell 125. As is illustrated by the first graph 170, the macro cell 120 may transmit downlink data on all frames except those designated as almost blank subframes (ABSs). As is illustrated by the second graph 175, the small cell 125 may transmit data to UEs designated as small cell inner UEs on all frames except those designated as ABS subframes. Accordingly, the small cell 125 may transmit data to UEs designated as small cell inner UEs following the same schedule as the macro cell 120. Further, as is illustrated by the second graph 175, the small cell 125 may transmit data to UEs designated as small cell border UEs on the subframes designated by the macro cell 120 as ABS subframes. In the example illustrated in FIG. 1B, an ABS pattern of the transmission schedules illustrated in first and second, graphs 170 and 175 is configured such that every third subframe is designated as an ABS subframe. Accordingly, in the ABS pattern illustrated in FIG. 1B, there is a 2-to-1 ratio between non-ABS subframes and ABS subframes.

The macro BS 110A may set the ABS pattern for downlink transmission in the macro cell 120 based on information received from a core network element included in the wireless communications network 100 including, for example, an OAM node. The macro BS 110A may then communicate the set ABS pattern to the small cell BS 110B so the small cell BS 110B can schedule downlink transmission in the small cell 125 based on the set ABS pattern. Though, in the example illustrated in FIG. 1B, the ABS pattern includes a 2-to-1 ratio between non-ABS subframes and ABS subframes, this is only an example, and the ABS pattern can include any ratio between non-ABS subframes and ABS subframes including, for example, 4-to-3, 3-to-2, 3-to-1, 4-to-1, etc.

By scheduling transmissions using the interference reducing scheme explained above with reference to FIG. 1B, interference experienced by UEs in wireless network 100 may be reduced. In order to implement the eICIC scheme, it is necessary to set criteria for determining whether UEs attached to the small cell 125 should be designated as small cell border UEs, like the second UE 105B, or small cell inner UEs, like the third UE 105C. This may be accomplished using a CBW. Referring again to FIG. 1A, the CBW 150 is used by the communications network 100 to determine whether UEs attached to the small cell 125 are to be to designated as small cell border UEs or small cell inner UEs. A UE in communications network 100 that is attached to the small cell 125 may be designated as a small cell border UE or a small cell inner UE based on a comparison of the macro receive signal level 135 as measured by the UE to the small cell receive signal level 140 as measured by the UE with use of a the CBW. For example, for a UE i currently attached to the small cell 125, if PR(i)>MR(i)+C, where MR(i) is the macro signal strength 135 measured at the mobile i, PR(i) is the small cell signal strength 140 measured at the mobile i, and C is the CBW value currently set for the small cell 125, then UE i may be designated as a small cell inner UE. Otherwise, if MR(i)−Bias<PR(i)<MR(i)+C, the UE i may be designated as a small cell border UE.

Accordingly, once a UE associated with the small cell 125 determines that the small cell receive signal level 140 has risen above the macro receive signal level 135 plus a CBW 150, the UE may send a message indicating its status to the small cell BS 110B, and the UE may be designated as a small cell inner UE. This message may be, for example, a message indicating that an A3 event occurred according to known methods defined for the LTE protocol. Further, once a UE associated with the small cell 125 determines that the small cell receive signal level 140 has fallen below the macro receive signal level 135 plus a CBW 150, and the small cell receive signal level 140 is still above the macro receive signal level 135 minus the bias value 145, the UE may send a message indicating its status to the small cell BS 110B, and the UE may be designated as a small cell border UE. This message may also be, for example, a message indicating that an A3 event occurred according to known methods defined for the LTE protocol. As is illustrated in FIG. 1A, the points at which the small cell receive signal level 140 is above the macro cell receive signal level 135 plus the CBW 150 define the boundaries of the small cell inner region 130. Accordingly, the CBW 150 may control how the UEs attached to the small cell 125 are divided into small cell border UEs and small cell inner UEs.

Overview of Method and Apparatus for Providing Increased Small Cell Utilization

As is described above with reference to FIGS. 1A and 1B the bias value 145 can be used to control an amount of UEs that are handed over from the macro cell 120 or the small cell 125, and the CBW 150 can be used to control how UEs attached to the small cell 125 are designated as small cell border UEs or small cell inner UEs. By tuning the bias value 145 and the CBW 150, a utilization of resources within the small cell 125 may be adjusted to have controlled, desired or optimal characteristics. A method of providing controlled, desired or optimized small cell utilization according to at least one example embodiment will now be discussed below with reference to FIGS. 1C, 2A, 2B and 3.

Figure 1C:
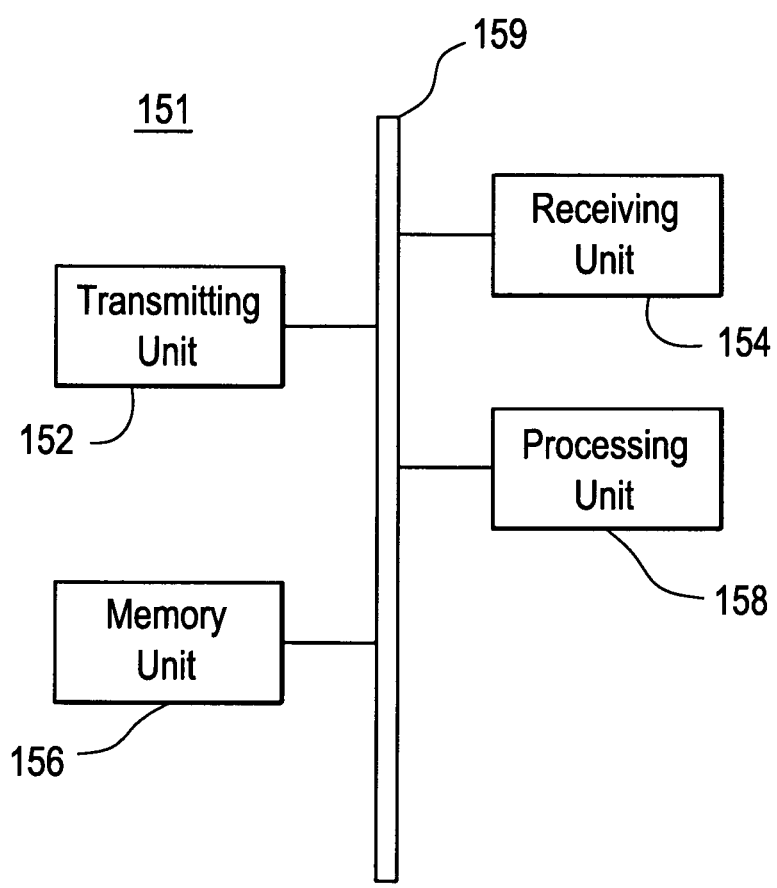
FIG. 1C is a diagram illustrating an example structure of a network element according to at least one example embodiment.

FIG. 1C is a diagram illustrating an example structure of a network element 151. According to at least one example embodiment, either or both of the small cell BS 110B and the macro BS 110A may have the structure and operation of the network element 151 described below. Referring to FIG. 1C, the network element 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wireless signals including, for example, data signals, control signals, and signal strength/quality infatuation via one or more wireless connections to other network elements in the wireless communications network 100. For example, if the network element 151 is the small cell BS 110B, the control signals may include, for example, control signals indicating to a UE to set a bias value and/or CBW value determined by the small cell BS 110B. As another example, if the network element 151 is the macro BS 110A, the control signals may include, for example, control signals indicating an overload condition of the macro cell 120 and/or an ABS pattern to the small cell 125. The overload condition and ABS pattern signals will be discussed in greater detail below with reference to FIG. 2A.

The receiving unit 154 is device that includes hardware and any necessary software for receiving wireless signals including, for example, data signals, control signals, and signal strength/quality information via one or more wireless connections to other network elements in communications network 100.

The memory unit 156 may be any device capable of storing data including magnetic storage, flash storage, etc.

The processing unit 158 may be any device capable of processing data including, for example, a microprocessor configured to carry out specific operations based on input data, or capable of executing instructions included in computer readable code.

For example, the processing unit 158 is capable of determining when UEs are to be handed over from the small cell 125 to the macro cell 120, or vice versa. If the network element 151 is the small cell BS 110B, the processing unit 158 is capable of determining whether a UE attached to the small cell BS 110B should be designated as a small cell inner UE or a small cell border UE, and the processing unit 158 is also capable calculating utilization statistics for small cell inner UEs and small cell border UEs attached to the small cell BS 110B. As another example, the processing unit 158 is capable of performing signal strength/quality estimates based on signal strength/quality indicators received from a UE, and performing comparisons based on the signal strength/quality estimates. Though, for the purpose of simplicity, the structure and operation of the network element 151 are only described above with reference to implementations of the small cell BS 110B and the macro BS 110A, according to at least one example embodiment, any or all other BSs in the communications network 100 may have the same structure and operation as the network element 151.

Example methods for operating the network element 151, the small cell BS 110B, and the macro BS 110A will now be discussed in greater detail below with reference to FIGS. 2A, 2B and 3.

Figure 2A:
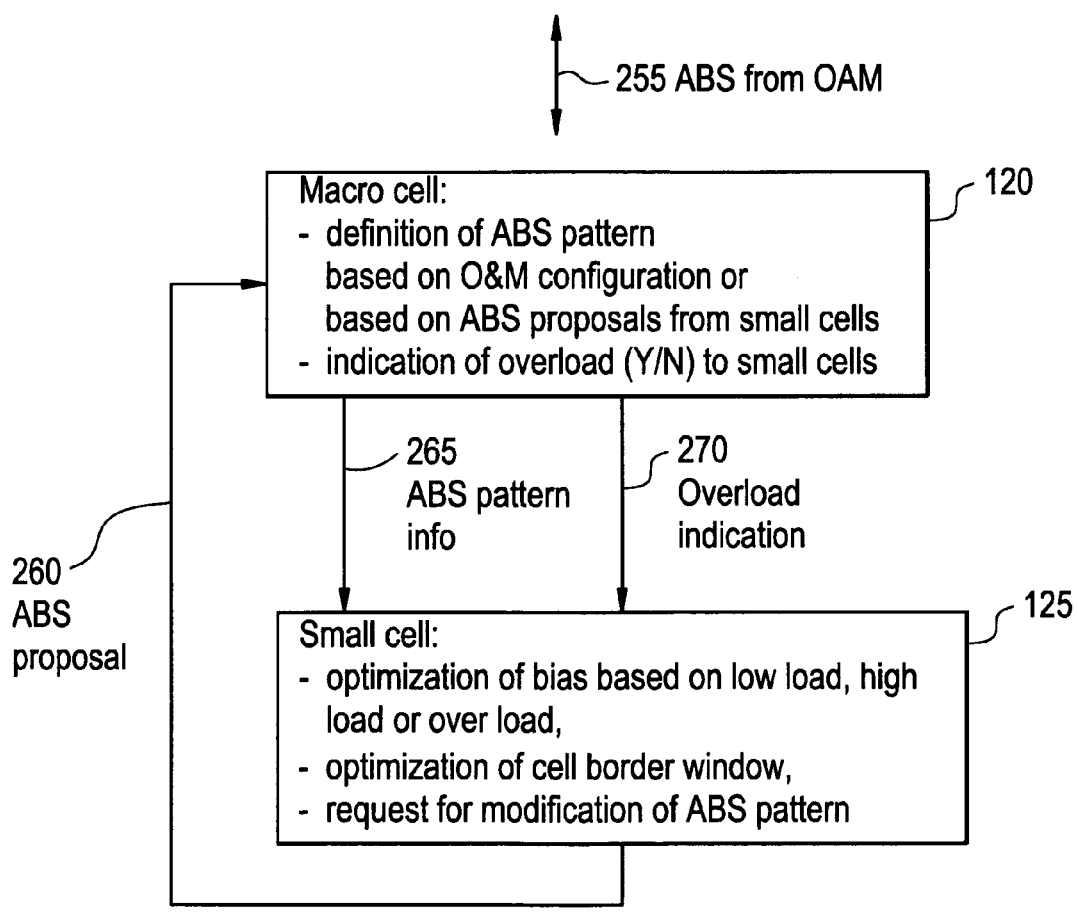
FIG. 2A is a diagram for explaining operations of a macro cell and a small cell according to at least one example embodiment.

FIG. 2A is a diagram for explaining operations of the macro cell 120 and the small cell 125.

Referring to FIG. 2A, according to at least one example embodiment, operations of the macro cell 120 and the small cell 125 may be divided into three basic operations: 1) defining an ABS pattern and determining an overload condition at the macro cell 120, which will be discussed in greater detail below with reference to FIG. 2A; 2) determining the bias value 145 at the small cell 125, which will be discussed in greater detail below with reference to FIGS. 2A and 2B; and 3) determining the CBW 150 at the small cell 125, which will be discussed in greater detail below with reference to FIGS. 2A and 3.

Figure 2B:
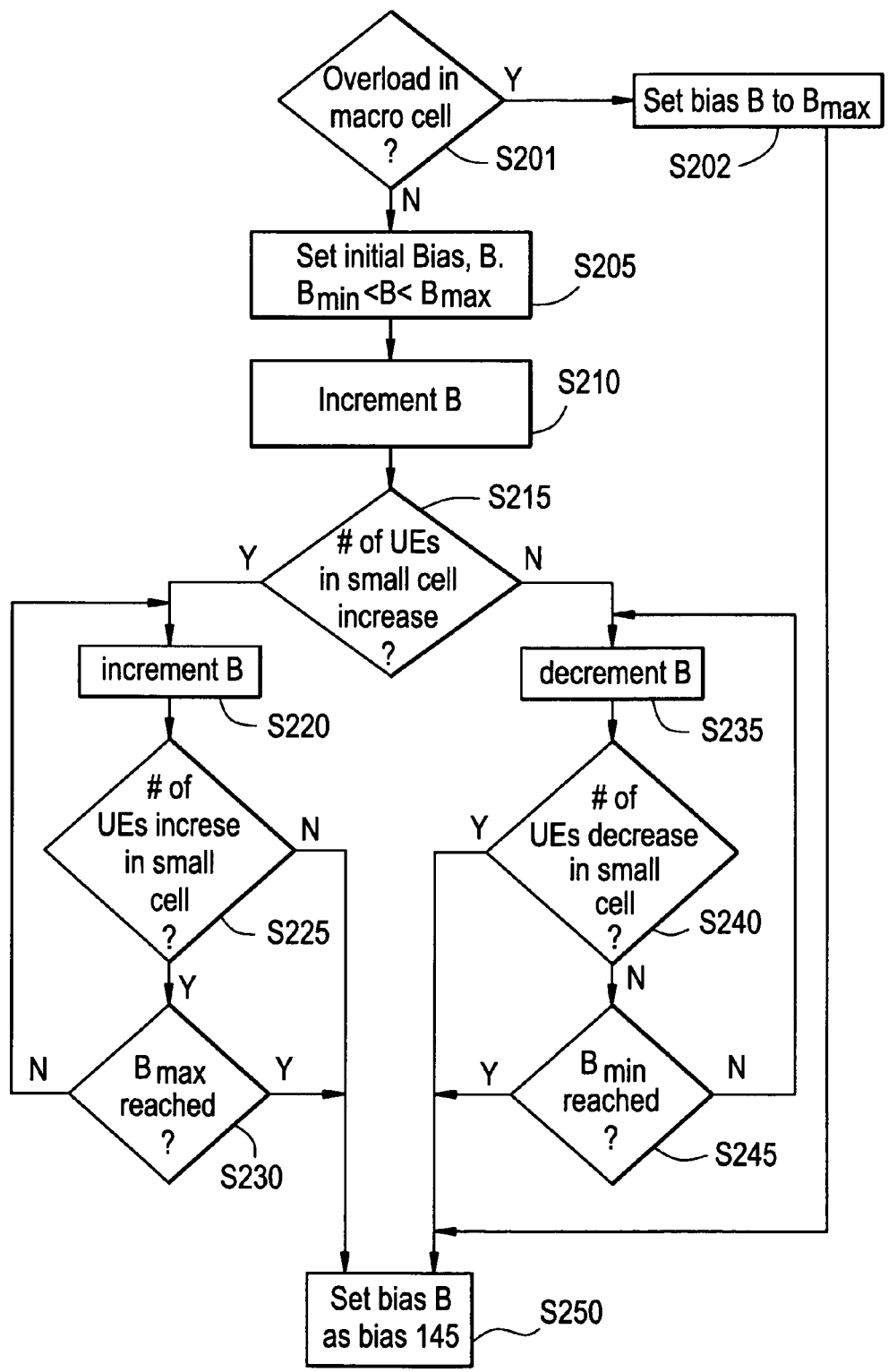
FIG. 2B is a flow chart illustrating a method for determining a bias value according to at least one example embodiment.
Figure 3:
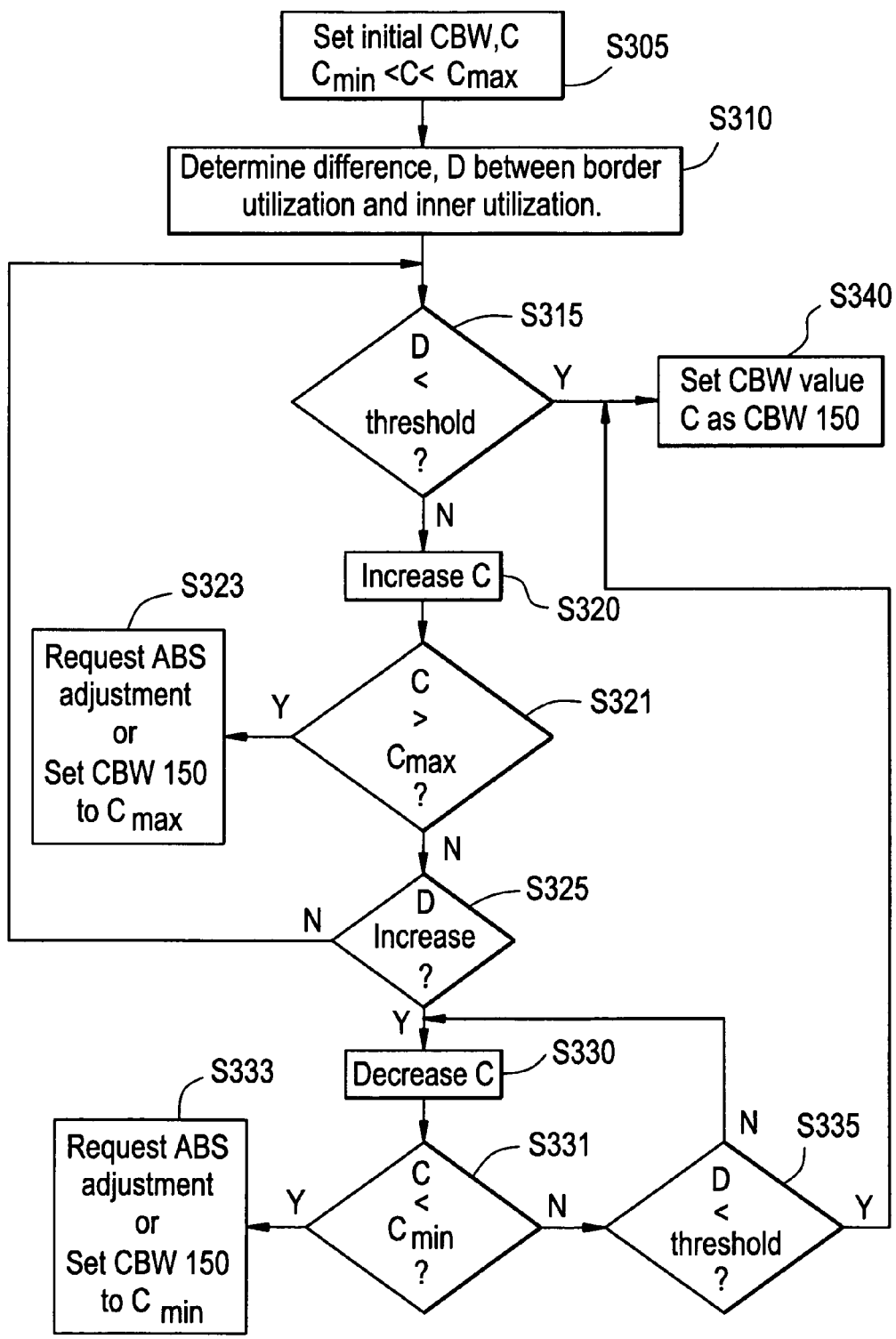
FIG. 3 is a flow chart illustrating a method for determining a cell border window (CBW) according to at least one example embodiment.

According to at least one example embodiment, each of the operations illustrated in, or described with respect to, FIGS. 2A, 2B and 3 as being performed by a BS or a cell may be performed by, for example, one or more BSs having the structure of the network element 151 as illustrated in FIG. 1C. For example, the memory unit 156 may store executable instructions corresponding to each of the operations described below with reference to in FIGS. 2A, 2B and 3.

Further, the processor unit 158 may be configured perform each of the operations described below with respect to FIGS. 2A, 2B and 3. Further, according to at least one example embodiment, transmitted data and/or control signals may be transmitted through the transmitting unit 152, and received data and/or control signals may be received through the receiving unit 154.

The operation of defining an ABS pattern and determining an overload condition at the macro cell will now be discussed in greater detail below.

Defining an ABS Pattern and Determining an Overload Condition at the Macro Cell

As is illustrated in FIG. 2A, the macro cell 120 may receive ABS information 255 from a core network node included in the wireless network. The ABS information may be structured, sent and received according to known methods. In the example illustrated in FIG. 2A, the core network node from which the ABS information 255 is received is an OAM node. The macro cell 120 may use the ABS information 255 to define an ABS pattern according to known methods. For example, the ABS pattern may specify that every third or fourth subframe transmitted by the macro cell 120 to UEs attached to the macro cell 120 is an ABS subframe.

As will be discussed in greater detail below, according to at least one example embodiment, the ABS pattern defined by the macro cell 120 may also be determined based on an ABS proposal 260 received from the small cell 125. According to at least one other example embodiment, the macro cell 120 does not receive an ABS proposal 260, and thus, the macro cell 120 uses only the ABS information 255, and not the ABS proposal 260, in determining the ABS pattern to use for transmitting downlink data.

Once the ABS pattern has been determined, the macro cell 120 sends the ABS pattern information 265 to the small cell 125. As is described above with reference to FIG. 1B, the small cell 125 can use the ABS pattern information 265 to determine downlink transmission schedules for small cell inner UEs and small cell border UEs.

In addition to determining the ABS pattern, the macro cell 120 determines whether or not the macro cell 120 is experiencing an overload condition. For example, the macro BS 110A may determine that the macro cell 120 is experiencing an overload condition if an amount of traffic associated with UEs attached to the macro cell 120, for example a total throughput, exceeds a threshold value. If the macro cell 120 determines an overload condition exists, the macro cell 120 sends an overload indication 270 to the small cell 125 indicating that an overload condition does exist (Y). Otherwise, the macro cell 120 may send an overload indication 270 to the small cell 125 indicating that an overload condition does not exists (N).

A method of determining a desired or optimal value for bias value 145 will now be discussed.

Determining a Bias Value at the Small Cell

Referring again to FIG. 2A, the small cell may determine a controlled or improved or optimized bias value to set as the bias value 145 illustrated in FIG. 1A. FIG. 2B is a flow chart illustrating an example method for determining a bias value according to at least one example embodiment. As will be discussed in greater detail below with reference to FIG. 2B, according to at least one example embodiment, the operations used for determining the bias value may depend on whether a loading condition of the macro cell is an overload condition, a high load condition, or a low load condition.

For an overload condition, it is assumed that urgent action is required to offload UE traffic from the macro cell 120 to the small cell 125 quickly. Accordingly, the small cell 125 automatically sets the bias value to a maximum value. For a high load condition, it is assumed that, though the macro cell 120 is not overloaded, the amount of UE traffic for the macro cell is high. Accordingly, the small cell 125 will incrementally increase a bias value until a reasonable, or desirable, amount of UE traffic is supported by the small cell 125. For a low load condition, it is assumed that the macro cell 120 is lightly loaded and is capable of efficiently handling its UE traffic without much or any assistance from the small cell 125. An example of light loading conditions would be loading conditions experienced late at night when relatively few UEs are active in the macro cell 120. Accordingly, the small cell 125 will incrementally decrease a bias value until a reasonable, or desirable, amount of UE traffic is supported by the small cell 125.

Further the bias value 145 may have upper and lower limits, Bmax and Bmin, respectively. The upper limit Bmax may represent the bias value which will cause the number of UEs attached to the small cell 125 to reach the maximum UE threshold of the small cell 125. Additionally or alternatively, the upper limit Bmax may represent the bias value which will cause a total throughput of UEs attached to the small cell 125 to reach a maximum throughput or physical resource threshold of the small cell 125. The maximum UE and maximum throughput thresholds of the small cell 125 may be set according to, for example, preferences of an operator of the wireless communications network 100, and/or limitations of processing hardware and/or software of the small cell BS 110B. The lower limit Bmin may be, for example, any value less than Bmax and greater than or equal to 0. FIG. 2B will now be discussed below with reference to the small cell BS 110B and a bias value B. In the process illustrated in FIG. 2B, the bias value B represents the bias 145, which is adjusted until a current iteration of the process ends, and thus, the bias 145 is set.

Referring to FIG. 2B, in step S201, the small cell BS 110B may determine whether an overload state exists in the macro cell 120. For example, as is discussed above with reference to FIG. 2A, the macro cell 120 sends an overload indication 270 to small cell 125. Thus, according to at least one example embodiment, the small cell BS 110B may use the overload indication 270 to determine whether or not the macro cell 120 is experiencing an overload condition. If the small cell BS 110B determines the macro cell 120 is experiencing an overload condition, the small cell BS 110B proceeds to step S202.

In step S202, the small cell BS 110B sets the bias value B to the upper limit Bmax and proceeds to step S250.

In step S250, the small cell BS 110B sets the current bias value B as the bias 145 for the small cell 125, and the method of determining a bias value for the small cell 125 ends.

Returning to step S201, if the small cell BS 110B determines that an overload condition does not exists at the macro cell 120, the small cell BS 110B proceeds to step S205.

In step S205, the small cell BS 110B sets an initial value for the bias value B. The initial value may be, for example, any value between upper and lower limits Bmax and Bmin. As an example, the initial bias value for bias value B may be the central value equidistant from the upper and lower limits Bmax and Bmin. For example, the bias value B may be initially set at the current bias value 145 for the small cell.

In step S210, the small cell BS 110B increments bias value B and proceeds to step S215.

In step S215, the small cell BS 110B determines whether a high load condition or a low load condition exists based on whether or not a number of UEs attached to the small cell 125 increased as a result of incrementing bias value B in step S210. If the number of UEs attached to the small cell 125 increased, it is assumed that a high load condition exits and the small cell BS 110B proceeds to step S220.

In step S220, bias value B is incremented again.

In step S225, the small cell BS 110B determines whether a number of UEs attached to the small cell 125 has increased.

If, in step S225, the small cell BS 110B determines that the number of UEs attached to the small cell 125 has not increased, the small cell BS 110B determines that a current number of UEs attached to the small cell 125 is desirable or reasonable with respect to the current loading condition of the macro cell 120, and the small cell BS 110B proceeds to step S250. In step S250, the small cell BS 110B sets the bias value B as the bias 145 for the small cell 125, and the method of determining a bias value for the small cell 125 ends.

If, in step S225, the small cell BS 110B determines that the number of UEs attached to the small cell 125 has increased, the small cell BS 110E proceeds to step S230.

In step S230, the small cell BS 110B determines whether a current value of the bias value B has reached the upper limit Bmax. If, in step S230, the small cell BS 110B determines that the upper limit Bmax has been reached, the small cell BS 110B proceeds to step S250. In step S250, the small cell BS 110B sets the current bias value B as the bias 145 for the small cell 125, and the method of determining a bias value for the small cell 125 ends.

If, in step S230, the small cell BS 110B determines that the upper limit Bmax has not been reached, the small cell BS 110B proceeds to step S220 where the bias value B is incremented again.

Accordingly, in steps S220~S230, the bias value B is continuously incremented by, for example, relatively small amounts until either the number of UEs attached to small cell 125 stops increasing, or the upper limit Bmax is reached. The number UEs attached to the small cell once the continuous incrementing stops may be considered to be a desirable number of UEs.

Returning to step S215, if, in step S215, the number of UEs attached to the small cell 125 did not increase, it is assumed that a low load condition exits and the small cell BS 110B proceeds to step S235.

In step S235, the bias value B is decreased.

In step S240, the small cell BS 110B determines whether a number of UEs attached to the small cell 125 has decreased.

If, in step S240, the small cell BS 110B determines that the number of UEs attached to the small cell 125 has decreased, the small cell BS 110B proceeds to step S250. In step S250, the small cell BS 110B sets the current bias value B as the bias 145 for the small cell 125, and the method of determining a bias value for the small cell 125 ends.

If, in step S240, the small cell BS 110E determines that the number of UEs attached to the small cell 125 has not decreased, the small cell BS 110B proceeds to step S245.

In step S245, the small cell BS 110B determines whether a current value of the bias value B has reached the lower limit Bmin. If, in step S245, the small cell BS 110B determines that the lower limit Bmin has been reached, the small cell BS 110B proceeds to step S250. In step S250, the small cell BS 110B sets the current bias value B as the bias 145 for the small cell 125, and the method of determining a bias value for the small cell 125 ends.

If, in step S245, the small cell BS 110B determines that the lower limit Bmin has not been reached, the small cell BS 110B proceeds to step S235 where the bias value B is decreased again.

Accordingly, in steps S235~S245, the bias value B is continuously decremented by, for example, relatively small amounts until either the number of UEs attached to small cell 125 decreases, or the lower limit Bmin is reached. The number UEs attached to the small cell once the continuous decrementing stops may be considered a desirable number of UEs.

The operations described above with reference to FIG. 2B as being performed by the macro cell 120 and the small cell 125 may be performed, for example, by the macro BS 110A and the small cell BS 110B.

Determining a CBW at the Small Cell

Referring again to FIG. 2A, the small cell may determine a controlled or improved or optimized CBW to set as the CBW 150 illustrated in FIG. 1A. FIG. 3 is a flow chart illustrating a method for determining a CBW according to at least one example embodiment. The goal in determining a value for the CBW 150 is to attempt to set the CBW 150 such that a utilization of UEs designated as small cell inner UEs matches the utilization of UEs designated as small cell border UEs, within a desired margin. The margin may be set in accordance with the preferences of an operator of the wireless communications network 100 and is represented in the method illustrated in FIG. 3 by a threshold. Utilization, as used herein, may refer to resource utilization in terms of, for example, physical resource blocks associated with the small cell 125.

As an example, according to example embodiments, assuming a threshold value of 2%, for a given ABS pattern and bias value, the small cell BS 110B may set the CBW 150 such that the utilization of UEs designated as small cell inner UEs (referred to hereafter as the inner UE utilization), and the utilization of UEs designated as small cell border UEs (referred to hereafter as the border UE utilization) exhibit a difference of no more than 2%.

According to at least one example embodiment, when determining whether border UE utilization and inner UE utilization are matched, the current ABS pattern is taken into account. For example, referring to the ABS pattern illustrated in FIG. 1B, there is a 2-to-1 ratio between subframes used for transmitting downlink data to inner UEs and subframes used for transmitting downlink data to border UEs. Thus, according to at least one example embodiment, using the ABS pattern illustrated in FIG. 1B, inner UE utilization will be considered to match border UE utilization if the inner UE utilization and border UE utilization exhibit a 2-to-1 relationship, within the desired margin. Consequently, according to at least one example embodiment, the goal of the method of determining the CBW illustrated in FIG. 3 may be viewed as matching the utilization-per-subframe of the inner UEs to the utilization-per-subframe of the border UEs.

Further, as will be discussed in greater detail below with reference to FIG. 3, according to at least one example embodiment, if the small cell BS 110B determines that no CBW within the upper and lower limits Cmax and Cmin is capable of matching the inner UE utilization and the border UE utilization within the desired margin, the small cell BS 110B may generate a suggestion for a new ABS pattern. As is illustrated in FIG. 2A, the small cell 125 may forward the suggestion to the macro cell 120 as ABS proposal 260. For example, the ABS proposal 260 may be sent as though one or more 'private messages', which are defined by 3GPP standards for an X2 interface. According to at least one other example embodiment, the small cell 125 does not generate or send an ABS proposal.

The CBW 150 may have upper and lower limits, Cmax and Cmin, respectively. The upper limit Cmax and lower limit Cmin may each be set according to the preferences of an operator of the wireless communications network 100. FIG. 3 will now be discussed below with reference to the small cell BS 110B and a CBW value C. In the process illustrated in FIG. 3, the CBW value C represents the CBW 150, which is adjusted until a current iteration of the process ends, and thus, the CBW 150 is set.

Referring to FIG. 3, in step S305 the small cell BS 110B sets an initial value for the CBW value C. The initial value may be, for example, any value between upper and lower limits Cmax and Cmin. As an example, the initial CBW value may be the central value equidistant from the upper and lower limits Cmax and Cmin. For example, the CBW value C may be initially set at the current CBW value 150 for the small cell.

In step S310, the small cell BS 110B determines a difference, D, between an inner UE utilization and a border UE utilization. For example, based on the current ABS pattern being used in the macro cell 120 and the small cell 125, the small cell BS 110B may determine a percentage difference that exists between the utilization-per-subframe of the inner UEs and the utilization-per-subframe of the border UEs. The small cell BS 110B may determine the utilizations of the inner and border UEs according to known methods by, for example, evaluating statistics regarding a portion of total available resource blocks used by the inner UEs and the borer UEs, respectively. Once the difference D is determined, the small cell BS proceeds to step S315.

In step S315, the small cell BS compares the difference D determined in step S310 to a threshold value. The threshold value may represent the desired margin within which a network operator of the wireless communications network 100 wishes the difference D to fall. If the difference D is below the threshold, the small cell BS 110B proceeds to step S340.

In step S340, the small cell BS 110B sets the current CBW value C as the CBW value 150 and the method for determining the CBW value ends.

If in step S315, the small cell BS 110B determines the difference D is not below the threshold, the small cell BS 110B proceeds to step S320.

In step S320, the small cell BS 110B increases the CBW value C and proceeds to step S321.

In step S321, the small cell BS 110B compares the CBW value C to the upper limit Cmax. If the CBW value C exceeds the upper limit Cmax, the small cell BS 110B proceeds to step S323.

According to at least one example embodiment, in step S323 the small cell BS 110B may generate a proposed ABS pattern and send the proposal to the macro BS 110A as the ABS proposal 260. For example, the small cell BS 110B may determine that since the upper limit Cmax has been reached and the difference D has not yet been lowered below the threshold, there exists no CBW value C below the upper limit Cmax which can cause the inner UE utilization-per-subframe and border UE utilization-per-subframe to be matched, within the desired margin, with respect the current ABS pattern. Accordingly, the small cell BS 110B can propose a change to the ABS pattern in order to alter the ratio of subframes assigned to inner UEs and border UEs. For example, in step S323 the UE may determine that the portion of subframes assigned to the border UEs is to high, and thus the small cell BS 110B may generate and send an ABS proposal 260 indicating an ABS pattern which increases the ratio of non-ABS subframes to ABS subframes. The macro cell 120 may generate new ABS pattern information 265 based on the ABS proposal 260. Afterwards, the small cell BS 110B may return to step S305 to make another attempt at determining a suitable CBW with respect to the new ABS pattern.

According to another example embodiment, in step S323, the small cell BS 110B does not generate the ABS proposal 260 or send the ABS proposal 260 to the macro cell 120. Instead, the small cell BS 110B may regard the upper limit Cmax as the allowable CBW value which achieves a difference D closest to the threshold and set the CBW 150 to the upper limit Cmax. The method then ends.

Returning to step S321, if, in step S321, the CBW value C does not exceed the upper limit Cmax, the small cell BS 110B proceeds to step S325.

In step S325, the small cell BS 110B determines whether or not the difference D has increased. If the difference D has not increased, the small cell BS 110B may determine that the inner UE utilization was higher than the border UE utilization before the CBW value C was increased in step S320. In general, increasing the CBW will cause a number of border UEs to increase and a number of inner UEs to decrease. Accordingly, the small cell BS 110B may continuously perform steps S315-S325 until the difference D falls below the threshold or the CBW value C reaches the upper limit Cmax.

If, in step S325, the small cell BS 110B determines the difference D has increased, the small cell BS 110B may determine that the inner UE utilization is lower the border UE utilization and the small cell BS 110B proceeds to step S330.

In step S330, the CBW value C is decreased and the small cell BS 110B proceeds to step S331.

In step S331, the small cell BS 110B compares the CBW value C to the lower limit Cmin. If the CBW value C is lower that the lower limit Cmin, the small cell BS 110B proceeds to step S333.

According to at least one example embodiment, in step S333 the small cell BS 110B may generate a proposed ABS pattern and send the proposal to the macro BS 110A as the ABS proposal 260 illustrated in FIG. 2A. For example, the small cell BS 110B may determine that since the CBW value C has reached the lower limit and a the difference D has not yet been lowered below the threshold, there exists no CBW value C above the lower limit Cmin which can cause the inner UE utilization-per-subframe and border UE utilization-per-subframe to be matched, within the desired margin, for the current ABS pattern. Accordingly, the small cell BS 110B can propose a change to the ABS pattern in order to alter the ratio of subframes assigned to inner UEs and border UEs. For example, in step S333 the UE may determine that the portion of subframes assigned to the inner UEs is to high, and thus the small cell BS 110B may generate and send an ABS proposal 260 indicating an ABS pattern which decreases the ratio of non-ABS subframes to ABS subframes. Afterwards, the small cell BS 110B may return to step S305 to make another attempt at determining a suitable CBW with respect to the new ABS pattern.

According to at least one other example embodiment, in step S333, the small cell BS 110B does not generate the ABS proposal 260 or send the ABS proposal 260 to the macro cell 120. Instead, the small cell BS 110B may regard the lower limit Cmin and the CBW value which achieves a difference D closes to the threshold and set the CBW 150 to the lower limit Cmin. The method then ends.

Returning to step S331, if, in step S331, the small cell BS 110E determines the CBW value C is not lower that the lower limit Cmin, the small cell BS 110B proceeds to step S335.

In step S335 the difference D is compared to the threshold. If the difference D is below the threshold, the small cell BS 110B proceeds to step S340.

In step S340, the small cell BS 110B sets the current CBW value C as the CBW value 150 and the method for determining the CBW value ends.

If, in step S335, the small cell BS 110B determines the difference D is not below the threshold, the small cell BS 110E returns to step S330 where the CBW value C is again decreased. In general, decreasing the CBW will cause a number of border UEs to decrease and a number of inner UEs to increase. Accordingly, the small cell BS 110E may continuously perform steps S330-S335 until the difference D falls below the threshold or the CBW value C reaches the lower limit Cmin.

Thus, according to the methods described above with reference to FIGS. 2A, 2B and 3, controlled, optimal or desirable values for a bias and a CBW may be determined for heterogeneous wireless networks including networks implementing interference reduction schemes which are the same as or similar to the eICIC scheme defined by the 3GPP Release 10 standards. The bias and CBW values generated by the methods described above with reference to FIGS. 2A, 2B and 3 may result in improved network performance by providing balanced utilization between inner UEs and border UEs.

Example embodiments being thus described, it will be obvious that the same may be varied in many ways. Such variations are not to be regarded as a departure from example embodiments, and all such modifications are intended to be included within the scope of example embodiments.

What is claimed is:

1. A method of determining a bias parameter for a heterogeneous network including a small cell, a macro cell, and a plurality of user equipment (UEs), the small cell being underlaid with respect to the macro cell, the method comprising:

determining, at a base station of the small cell, a loading state of the macro cell by
  performing a first incrementing operation at the base station by incrementing a bias parameter, the bias parameter being a parameter which controls a tendency of the plurality of UEs to be handed over from the macro cell to the small cell,
  determining, after incrementing the bias parameter, whether a small cell load increases, the small cell load being a number of the plurality of UEs connected to the small cell, and
  determining the loading state of the macro cell based on whether or not the small cell load increased after incrementing the bias parameter; and setting, at the base station of the small cell, the bias parameter based on the determined loading state.

2. The method of claim 1, wherein the determining step includes determining whether the loading state of the macro cell is a high load state or a low load state.

3. The method of claim 2, wherein if the loading state is a high load state, setting the bias parameter includes incrementally increasing the bias parameter until a desired number of UEs are attached to the small cell.

4. The method of claim 2, wherein if the loading state is a low load state, setting the bias parameter includes incrementally decreasing the bias parameter until a desired number of UEs are attached to the small cell.

5. The method of claim 1, wherein the heterogeneous network follows the long term evolution (LTE) protocol and implements an enhanced inter cell interference coordination (eICIC) scheme.

6. A method of determining a cell border window (CBW) for a small cell included in a heterogeneous network, the heterogeneous network further including a macro cell, the small cell being underlaid with respect to the macro cell, the small cell having a plurality of attached UEs which are divided into inner cell UEs and border cell UEs, the method comprising:

determining, at a base station of the small cell, a difference value based on utilization values of the inner cell UEs and the border cell UEs; and adjusting the CBW based on the difference value and a threshold value.

7. The method of claim 6, wherein the CBW is a parameter which controls a tendency of UEs from among the plurality of attached UEs to be inner cell UEs or border cell UEs.

8. The method of claim 6, further comprising:
   initializing the CBW as a value between upper and lower CBW limits;
   determining, at the base station, an inner utilization value based on a resource utilization of the inner cell UEs; and
   determining, at the base station, a border utilization value based on a resource utilization of the border cell UEs,
   wherein the difference value is determined based on the inner utilization value and the border utilization value.

9. The method of claim 8, wherein determining the difference value includes
   comparing the inner utilization and the border utilization,
   calculating a difference between the inner utilization and the border utilization, and
   determining the calculated difference to be the difference value.

10. The method of claim 8, wherein,
    if the base station determines the difference value is above the threshold value and the inner utilization is higher than the border utilization value, the adjusting step includes increasing the CBW until the difference value becomes less than the threshold or the CBW exceeds the upper CBW limit, and
    if the base station determines the difference value is above the threshold value and the inner utilization is lower than the border utilization value, the adjusting step includes decreasing the CBW until the difference value becomes less than the threshold or the CBW becomes lower than the lower CBW limit.

11. The method of claim 10, further comprising:
    completing adjustment of the CBW if the CBW is in between the upper and lower CBW limits, and the difference value is below the threshold;
    adjusting the CBW to equal the upper CBW limit and completing adjustment of the CBW if the CBW is above the upper CBW limit; and
    adjusting the CBW to equal the lower CBW limit and completing adjustment of the CBW if the CBW is below the lower CBW limit.

12. The method of claim 10, further comprising:
    determining an almost blank subframe (ABS) pattern proposal and sending the ABS pattern proposal from the base station to the macro cell if the base station determines the difference value is above the threshold value and the adjusted CBW is greater than the upper CBW limit or lesser than the lower CBW limit.

13. The method of claim 6, wherein the heterogeneous network follows the long term evolution (LTE) protocol and implements an enhanced inter cell interference coordination (eICIC) scheme.

14. An network apparatus for supporting wireless communications of one or more user equipment (UEs) in a small cell included in communications network, the network further including a macro cell, the small cell being underlaid with respect to the macro cell, the apparatus comprising:
    a receiver unit configured to receive data;
    a transmitting unit configured to transmit data;
    a memory unit configured to store parameters corresponding with characteristics of the small cell; and
    a processing unit coupled to the transmitting unit, the receiving unit, and the memory unit and configured to control operations associated with determining network parameters for use within the network, the operations including at least one of,
    (1) determining a bias parameter for the network by determining, a loading state of the macro cell, and setting the bias parameter based on the loading state, and
    (2) determining a cell border window (CBW) for the small cell by
        determining a difference value based on utilization values of inner cell UEs and the border cell UEs of the small cell; and
        adjusting the CBW based on the difference value and a threshold value.

15. The network apparatus of claim 14, wherein, if the operations include determining the bias parameter, the bias parameter is a parameter which controls a tendency of the one or more UEs to be handed over from the macro cell to the small cell.

16. The network apparatus of claim 15, wherein, if the operations include determining the bias parameter, determining the loading state includes determining whether the loading state of the macro cell is an overload state, a high load state of a low load state.

17. The network apparatus of claim 16, wherein, if the operations include determining the bias parameter
    setting the bias parameter includes setting the bias parameter to a maximum bias value level if the loading state is an overload state,
    setting the bias parameter includes incrementally increasing the bias parameter until a desired number of UEs are attached to the small cell if the loading state is a high load state, and
    setting the bias parameter includes incrementally decreasing the bias parameter until a desired number of UEs are attached to the small cell if the loading state is a low load state.

18. The network apparatus of claim 14, wherein the CBW is a parameter which controls a tendency of UEs from among a plurality of attached UEs to be inner UEs or border UEs.

19. The network apparatus of claim 14, wherein the processor is further configured to:
    initializie the CBW as a value between upper and lower CBW limits;
    determine an inner utilization value based on a resource utilization of the inner cell UEs; and
    determine a border utilization value based on a resource utilization of the border cell UEs,
    wherein the difference value is determined based on the inner utilization value and the border utilization value.

* * * * *